July 31, 1956

J. POZARYSKI 2,757,347

INDUCTION APPARATUS

Filed July 30, 1954

WITNESSES:
E. A. McCloskey.
R. H. Thomas

INVENTOR
Jon Pozaryski.
BY
Ezra W. Savage
ATTORNEY

July 31, 1956  J. POZARYSKI  2,757,347
INDUCTION APPARATUS
Filed July 30, 1954  3 Sheets-Sheet 2

United States Patent Office 2,757,347
Patented July 31, 1956

2,757,347

INDUCTION APPARATUS

Jan Pozaryski, Sharon, Pa., assignor to Westinghouse Electric Corporation, Pittsburgh, Pa., a corporation of Pennsylvania Application July 30, 1954, Serial No. 446,858

4 Claims. (Cl. 336—180)

This invention relates to induction apparatus and more particularly to the disposition of a tapped transformer winding.

Heretofore, tap leads for a transformer winding have been connected intermediate the ends of the column forming the tapped winding. Such a prior art arrangement has several disadvantages. For instance, when the tap leads are brought out intermediate the ends of the column forming the tapped winding an improper ampere-turn balancing is obtained between the tapped winding and the other winding inductively associated therewith. The improper ampere-turn balancing results from the fact that in most of the tap positions current does not flow through the entire length of the column forming the tapped winding.

When an improper ampere-turn balancing is obtained between the tapped winding and the other winding inductively associated therewith a cross component of the normal leakage flux is established which effects additional losses to the transformer tank wall and to the core lock plate associated with the core. In addition, such cross flux cuts the conductor in an improper direction thereby effecting eddy current losses in the conductors. Further, the non-uniform ampere-turn distribution effects a relatively high vertical stress tending to force the conductor turns apart in the vertical direction.

In addition to the above-mentioned disadvantages obtained when utilizing a prior art tapped winding in which the tap leads are brought out intermediate the ends of the column forming the tapped winding, there is the disadvantage of having to provide relatively long tap leads. Further, such long and cumbersome tap leads take up space which could be more effectively utilized.

An object of this invention is to provide for so disposing a plurality of coils to form a tapped inductive winding that the winding comprises a plurality fo axially disposed layers or columns in which substantially all of the ends of the coils are disposed radially adjacent one another at one end of the layers, so that the coils can be joined to form the winding with a minimum of crossover connections and so that tap leads can be readily brought out at this end of the layers.

Another object of this invention is to provide for minimizing cross flux in a transformer having a tapped winding, by so disposing the tapped winding in a plurality of axially disposed layers or columns and so tapping the winding that in operation current flows through substantially the total length of the axially disposed layers or columns, thereby maintaining a proper ampere-turn balancing between the tapped winding and another winding associated therewith, and thus minimizing the formation of cross flux in the transformer.

Still another object of this invention is to provide for minimizing cross flux in a transformer having a tapped winding, to thereby minimize the eddy current loss in the transformer and the vertical forces on the transformer as produced by the cross flux.

A further object of this invention is to provide for obtaining the above-mentioned objects while at the same time minimizing the voltage stress between adjacent conductor turns in each axially disposed layer or column of the tapped winding.

Other objects of this invention will become apparent from the following description when taken in conjunction with the acompanying drawings in which.

Figure 1:
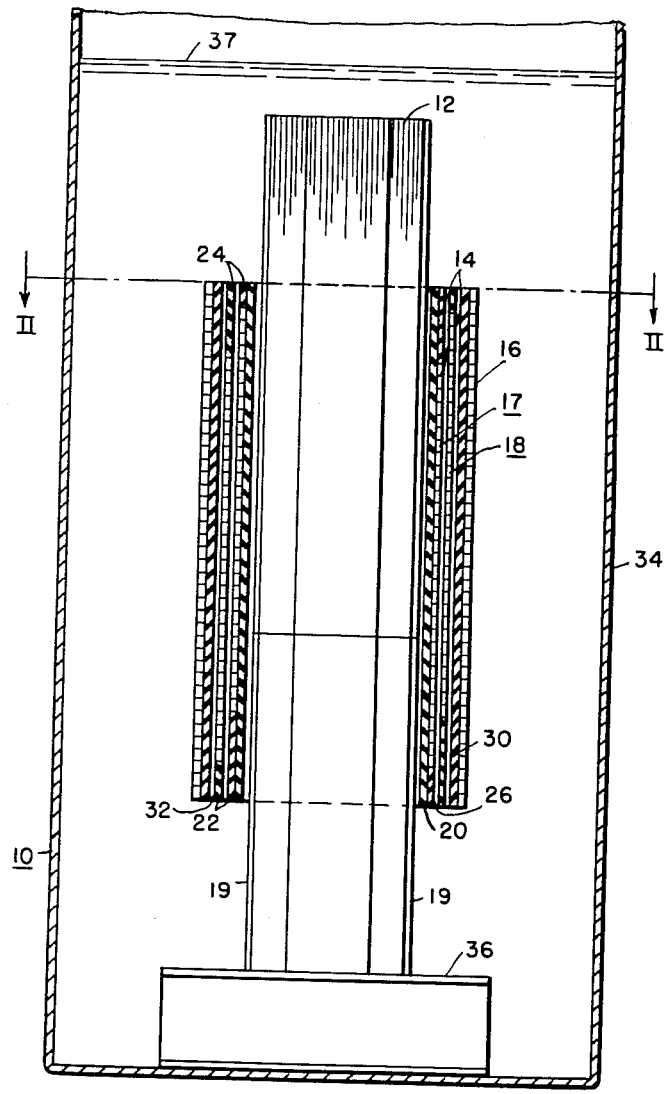
Figure 1 is a schematic diagram of a transformer in which this invention is incorporated.

Referring to Fig. 1, this invention is illustrated by reference to a transformer 10. In general, the transformer 10 comprises a magnetic core member 12, having a plurality of laminations, a tapped secondary winding 14 disposed in inductive relationship with the magnetic core member 12, and a primary winding 16 likewise disposed in inductive relationship with the magnetic core member 12. Thus, the primary winding 16 is disposed in inductive relationship with the tapped secondary winding 14 and the column forming the primary winding 16 extends throughout the length of the two layers or columns 17 and 18 forming the tapped secondary winding 14.

In order to maintain the laminations of the magnetic core member 12 in place, core lock plates 19 are disposed on two of the sides of the magnetic core member 12. On the other hand, in order to electrically insulate the inner layer of column 17 of the tapped secondary winding 14 from the magnetic core member 12, a cylindrical shaped member 20, constructed of suitable insulating material, is disposed between the magnetic core member 12 and the inner layer or column 17 of the tapped secondary winding 14.

For the purpose of properly starting and terminating the tapped secondary winding 14, and in order to properly position the winding 14 in the vertical direction, lower and upper cylindrical shaped collar members 22 and 24, respectively, are disposed on the ends of the two layers or columns 17 and 18. In this instance, a plurality of vertically positioned spacer members 26 are disposed between the two layers 17 and 18 forming the tapped secondary winding 14. These vertically positioned spacer members 26, which are circumferentially spaced around the inner layer 17 of the tapped secondary winding 14, function to electrically insulate the inner layer 17 of the tapped secondary winding 14 from its outer layer 18.

Figure 2:
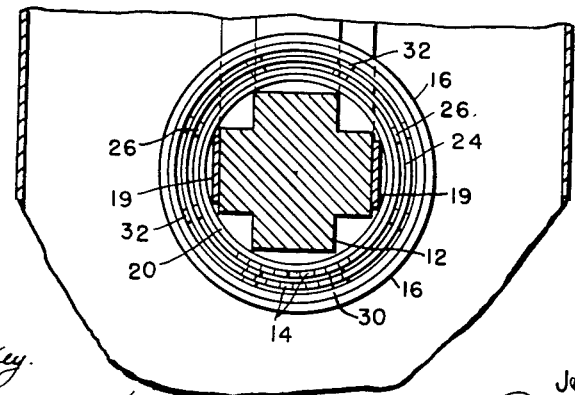
Fig. 2 is a view in section taken along the lines II—II of Fig. 1.

In order to electrically insulate the tapped secondary winding 14 from the primary winding 16 a cylindrical shaped insulating member 30 is disposed between the secondary winding 14 and the primary winding 16. However, as illustrated, a plurality of vertically positioned spacer members 32 are positioned between the outer layer 18 of the tapped secondary winding 14 and the insulating member 30. Then as can be seen from Figs. 1 and 2, the primary winding 16 is disposed around the insulating member 30.

As is customary, the magnetic core member 12 and its associated secondary and primary windings 14 and 16, respectively, are disposed in a transformer tank 34, the magnetic core member 12 being suitably supported on a lower support member 36. Also as is customary, the magnetic core member 12 and its associated windings 14 and 16 are immersed in a suitable dielectric medium such as transformer coil 37.

Figure 3:
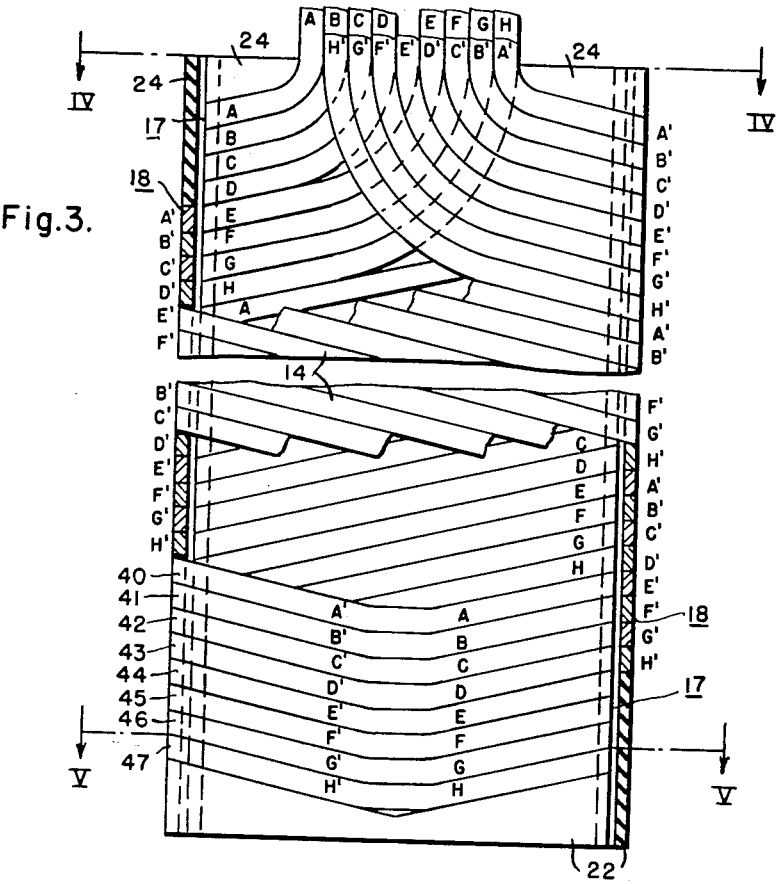
Fig. 3 is a schematic diagram, partly in section, of the tapped secondary winding illustrated in Fig. 1.
Figure 5:
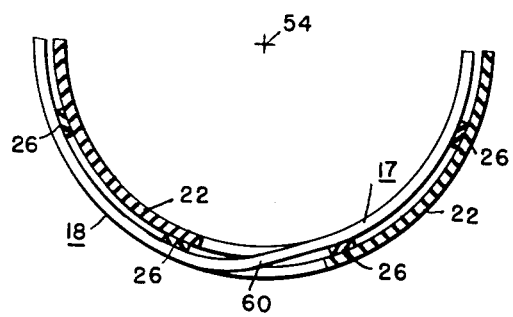
Fig. 5 is a view in section taken along the line V—V of Fig. 3.

Referring to Fig. 3, the tapped secondary winding 14 is illustrated in greater detail. In this instance, the tapped secondary winding 14 comprises eight coils 40 through 47. As illustrated, the coils 40 through 47 are wound spirally adjacent one another in one axial direction, namely downwardly, so as to form the axially disposed layer or column 17 of conductor turns. However, in addition, the coils 40 through 47 are also wound spirally adjacent one another in the opposite axial direction, namely upwardly, so as to form the axially disposed layer or column 18 of conductor turns, the crossover of the coils 40 through 47 from the inner layer 17 to the outer layer 18 taking place at 60, as illustrated in Fig. 5. Once the crossover of the coils 40 through 47 has been made the outer of the two lower collar members 22 functions to properly start the coils 40 through 47 spirally upward in the proper manner. Also as illustrated in Fig. 5, the layers or columns 17 and 18 are radially spaced from one another or in other words are spaced at different radial distances from a vertical axis 54.

In order to more clearly understand the winding arrangement illustrated in Fig. 3 the portion of the coils 40 through 47 appearing in the layer 17 have been designated A, B, C, D, E, F, G and H, respectively. That is, the portion of the coil 40 appearing in the layer or column 17 is designated A. In like manner, the portion of the coils 40 through 47 appearing in the layer or column 18 have been designated A', B', C', D', E', F', G', and H', respectively. That is, the portion of the coil 40 appearing in the layer or column 18 is designated A'.

A portion of each of the coils 40 through 47 appears in each of the layers or columns 17 and 18. Thus, in operation current flows through substantially the entire length of the layers 17 and 18 of the secondary winding 14 irrespective of the positioning of the tap changer (not shown) that is associated with the tapped secondary winding 14. Such being the case, in operation there is always a proper ampere-turn balancing between the secondary winding 14 and the primary winding 16. This maintains the cross flux in the transformer 10 at a minimum and thus prevents additional losses to the wall of the transformer tank 34 and to the core lock plates 19. In addition, by minimizing the cross flux which cuts the conductor in an improper direction eddy current losses are minimized. Further, since the ampere-turn distribution is maintained substantially uniform the vertical stresses tending to force apart the vertically adjacent conductor turns in each of the windings 14 and 16 are minimized.

By winding the coils 40 through 47 as hereinbefore explained, the outer ends 62, 64, 66, 68, 70, 74 and 75 of the coils 40, 41, 42, 43, 44, 45, 46 and 47, respectively, can be positioned in close vicinity to the inner ends 76, 78, 80, 82, 84, 86, 88 and 90 of the coils 40, 41, 42, 43, 44, 45, 46 and 47, respectively. In particular, the outer ends 62, 64, 66, 68, 72, 74 and 75 are disposed substantially radially adjacent the inner ends 90, 88, 86, 84, 82, 80 and 78, respectively.

Figure 4:
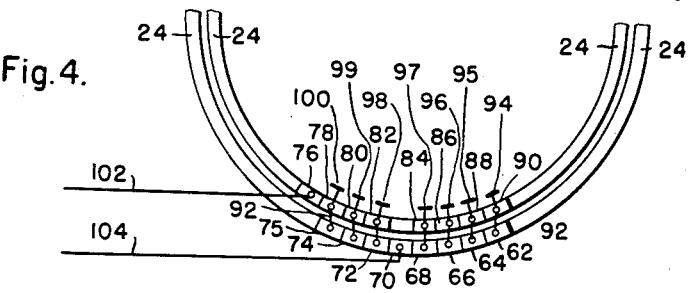
Fig. 4 is a view, partly in section, taken along the line IV—IV of Fig. 3.

In order to form the coils 40 through 47 into one continuous winding, namely the tapped winding 14, the radially adjacent inner and outer ends of the coils 40 through 47 are suitably connected together, such as, by means of the straps 92, illustrated in Fig. 4. Thus, it is not necessary to provide any crossover connections at the upper end of the layers 17 and 18 in order to form the coils 40 through 47 into one continuous winding.

Figure 6:
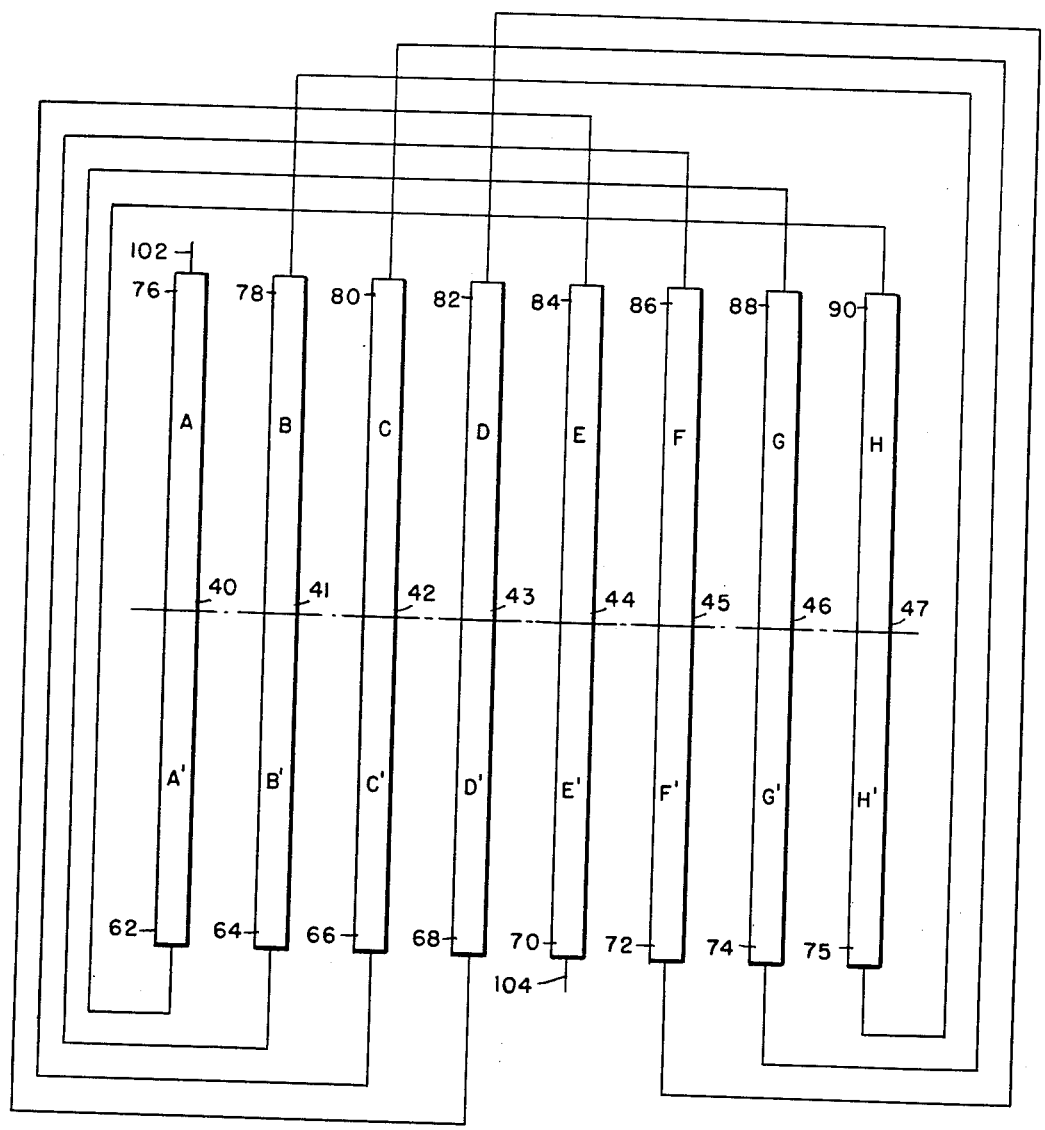
Fig. 6 is a schematic diagram of the coils of the tapped secondary winding illustrated in Figs. 1 and 3 shown in the unwound position, illustrating the manner in which the various coils are interconnected so as to form one continuous winding.

The manner in which the ends of the coils 40 through 47 are interconnected so as to form one continuous winding can be better understood by referring to the schematic diagram illustrated in Fig. 6. In Fig. 6 the coils 40 through 47 are shown in the unwound position. As illustrated, the outer end 62 of the outer coil 40 is connected to the inner end 90 of the other outer coil 47, and progressively the corresponding ends of the next adjacent coils 41 and 46 on each side of the plurality of coils 40 through 47 are similarly connected. That is, the outer end 64 of the coil 41 is connected to the inner end 88 of the coil 46. In like manner, the outer end 66 of the coil 42 is connected to the inner end 86 of the coil 45. The outer end 68 of the coil 43 is connected to the inner end 84 of the coil 44.

Also as illustrated in Fig. 6, the outer end 75 of the outer coil 47 is connected to the inner end 78 of the coil 41 which is adjacent the outer coil 40 and progressively the corresponding ends of the next inner adjacent coils 46 and 42 are connected in a similar manner. That is, the outer end 74 of the coil 46 is connected to the inner end 80 of the coil 42. In like manner, the outer end 72 of the coil 45 is connected to the inner end 82 of the coil 43.

By so winding the coils 40 through 47 and so interconnecting the ends of the coils 40 through 47, as hereinbefore explained, the voltage stress between adjacent conductor turns in the column 17 and between adjacent conductor turns in the column 18 is maintained at a minimum. As illustrated, tap leads 94, 95, 96, 97, 98, 99 and 100 are connected to the inner ends 90, 88, 86, 84, 82, 80 and 78, respectively, of the coils 41 through 47 and output leads 102 and 104 are disposed to be interconnected through a tap changer (not shown) which functions to vary the magnitude of the voltage.

It is to be understood that the tapped secondary winding 14 can comprise more than two layers or columns, such as the layers 17 and 18, provided the number of layers or columns are multiples of two. It is also to be understood that this invention is not limited to eight coils wound spirally adjacent one another to form a tapped secondary winding. Further, the tapped winding embodying this invention may be disposed around the other winding that is inductively associated therewith rather than being disposed within the other winding as illustrated in Figs. 1 and 3. It is still further to be understood that the radially adjacent ends of the coils 40 through 47 can be suitably interconnected by welding together the radially adjacent ends.

The apparatus embodying the teachings of this invention has several advantages. For instance, since in operation current is always flowing through substantially the entire length of the layers or columns 17 and 18 of the secondary winding 14 there is at all times a proper ampere-turn balancing between the secondary winding 14 and the primary winding 16. By having a proper ampere-turn balancing between the secondary winding 14 and the primary winding 16 the production of cross flux is minimized. Such being the case, heating of the wall of the transformer tank 34 and heating of the core lock plates 19 is minimized. Also, when the production of cross flux is minimized, there is substantially no cutting the conductor in an improper direction and thus eddy current loss is minimized. Further, since the cross flux is minimized the distribution of current in the secondary winding 14 is not affected so as to effect a forcing apart of the secondary winding 14 and primary winding 16 in the vertical direction. Thus, vertical stresses on the transformer 10 are minimized.

Another advantage obtained by the winding arrangement described herein is that no crossover connections need be made either at the end of the layers 17 and 18 or intermediate their ends and yet a minimum of voltage stress is provided between adjacent conductor turns in a common layer. Further, it is very convenient to be able to bring the tap leads off at the end of the layers or columns 17 and 18, instead of having to bring the tap leads off intermediate the ends of the layers or columns forming the tapped winding. Also, since the tap leads are brought out at the end of the columns 17 and 18 the tapped winding can form the innermost winding of the transformer.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A tapped inductive winding comprising, a plurality of coils including two outer coils, each of the plurality of coils having an inner and an outer end, the plurality of coils being wound spirally adjacent one another in one axial direction so as to form an axially disposed layer of conductor turns, said plurality of coils also being wound spirally adjacent one another in the opposite axial direction so as to form another axially disposed layer of conductor turns spaced radially from the first layer of conductor turns, so that both the inner and outer ends of said plurality of coils are disposed as associated ends of said layers, the outer end of one of the two outer coils being connected to the inner end of the other of the two outer coils, and progressively the corresponding ends of the next inner adjacent coils of the said plurality of coils with respect to said outer coils being similarly connected, and the outer end of said other of the two outer coils being connected to the inner end of the inner coil adjacent said one of the two outer coils and progressively the corresponding ends of the next inner adjacent coils of the said plurality of coils being connected in a similar manner, to thereby form said inductive winding into one continuous winding, and tap leads connected to the said inductive winding at said associated ends of said layers.

2. A tapped inductor winding comprising, a plurality of coils including two outer coils, each of the plurality of coils having an inner and an outer end, the plurality of coils being wound spirally adjacent one another in one axial direction so as to form an axially disposed layer of conductor turns, said plurality of coils also being wound spirally adjacent one another in the opposite axial direction so as to form another axialy disposed layer of conductor turns spaced radially from the first layer of conductor turns, so that both the inner and outer ends of said plurality of coils are disposed at associated ends of said layers and all but one inner and one outer end of the said plurality of coils being disposed substantially adjacent one another in the radial direction, the outer end of one of the two outer coils being connected to the inner end of the other of the two outer coils, and progressively the corresponding ends of the next inner adjacent coils of the said plurality of coils with respect to said outer coils being similarly connected, and the outer end of said other of the two outer coils being connected to the inner end of the inner coil adjacent said one of the two outer coils and progressively the corresponding ends of the next inner adjacent coils of the said plurality of coils being connected in a similar manner, to thereby form said inductive winding into one continuous winding, and tap leads connected to the said inductive winding at said associated ends of said layers.

3. In a transformer, the combination comprising, a tapped inductive winding comprising, a plurality of coils including two outer coils, each of the plurality of coils having an inner and an outer end, the plurality of coils being wound spirally adjacent one another in one axial direction so as to form an axially disposed layer of conductor turns, said plurality of coils also being wound spirally adjacent one another in the opposite axial direction so as to form another axially disposed layer of conductor turns spaced radially from the first layer of conductor turns, so that both the inner and outer ends of said plurality of coils are disposed at associated ends of said layers, the outer end of one of the two outer coils being connected to the inner end of the other of the two outer coils, and progressively the corresponding ends of the next inner adjacent coils of the said plurality of coils with respect to said outer coils being similarly connected, and the outer end of said other of the two outer coils being connected to the inner end of the inner coil adjacent said one of the two outer coils and progressively the corresponding ends of the next inner adjacent coils of the said plurality of coils being connected in a similar manner, to thereby form said inductive winding into one continuous winding, tap leads connected to the said inductive winding at said associated ends of said layers, and another winding disposed in inductive relationship with said two axially disposed layers of conductor turns.

4. In a transformer, the combination comprising, a magnetic core member, a tapped inductive winding disposed in inductive relationship with the magnetic core member, the tapped inductive winding comprising a plurality of coils including two outer coils, each of the plurality of coils having an inner and an outer end, the plurality of coils being wound spirally adjacent one another in one axial direction so as to form an axially disposed layer of conductor turns, said plurality of coils also being wound spirally adjacent one another in the opposite axial direction so as to form another axially disposed layer of conductor turns spaced radially from the first layer of conductor turns, so that both the inner and outer ends of said plurality of coils are disposed at associated ends of said layers and all but one inner and one outer end of the said plurality of coils being disposed substantially adjacent one another in the radial direction, the outer end of one of the two outer coils being connected to the inner end of the other of the two outer coils, and progressively the corresponding ends of the next inner adjacent coils with respect to the two outer coils being similarly connected, and the outer end of said other of the two outer coils being connected to the inner end of the inner coil adjacent said one of the two outer coils and progressively the corresponding ends of the next inner adjacent coils of the said plurality of coils being connected in a similar manner, to thereby form said inductive winding into one continuous winding, tap leads connected to the said inductive winding at said associated ends of said layers, and another winding disposed in inductive relationship with the magnetic core member.

References Cited in the file of this patent

UNITED STATES PATENTS

| 1,481,585 | Beard | Jan. 22, 1924 |

FOREIGN PATENTS

| 23,366 | Netherlands | Jan. 15, 1931 |
| 580,585 | Great Britain | Sept. 12, 1946 |